United States Patent [19]
Palladino

[11] 3,763,309
[45] Oct. 2, 1973

[54] SUBCARRIER REGENERATOR AND PAL IDENTIFIER SYSTEM

[75] Inventor: Michael J. Palladino, Liverpool, N.Y.

[73] Assignee: General Electric Company, Portsmouth, Va.

[22] Filed: Feb. 8, 1972

[21] Appl. No.: 224,437

[52] U.S. Cl. .......... 178/5.4 P
[51] Int. Cl. .......... H04n 9/46
[58] Field of Search .......... 178/5.4 P

[56] References Cited

UNITED STATES PATENTS 2,736,859 2/1956 Pritchard et al. .......... 178/5.4 P

*Primary Examiner*—Robert L. Griffin
*Assistant Examiner*—George G. Stellar
*Attorney*—Stanley C. Corwin et al.

[57] ABSTRACT

Improved means for applying uniform-phase chrominance information to the "V" demodulator of a PAL system television receiver. An identifier receives burst signals directly from a burst gate, and opposed-phase subcarriers which are also applied to the "V" demodulator. Alternate-polarity pulses outputted by the identifier operate a switch for connecting the demodulator alternately at horizontal line rate to summed chroma information to obtain V chroma information of like phase.

6 Claims, 2 Drawing Figures

SUBCARRIER REGENERATOR AND PAL IDENTIFIER SYSTEM

BACKGROUND OF THE INVENTION

The present invention relates to television receivers and, more particularly, to improved means for commutating phase-alternating chroma information for application to a demodulator of a PAL system receiver.

In the development of standards for color television signals, various methods were evolved for encoding video and audio information in order to optimize the transmission, reception and reproduction thereof. In several such systems, a subcarrier is modulated by a pair of chroma signals lying in quadrature relative to one another. The phase of one of the chroma signals is periodically reversed by 180° so that phase errors produce opposing hue errors during successive periods. This type of system, called color phase alternation or CPA, may take several forms. For instance, alternation of the chroma signal may be at field or at line rate. Further, the averaging of successive reversed signals may be achieved visually or electrically.

When one of the two quadrature chroma signals is caused to reverse phase at the line rate of horizontal scansion, the system is known as the PAL system (Phase Alternation at Line rate). In order to properly demodulate the alternating-phase color information it is common practice in a PAL color television receiver to provide a pair of alternate chrominance signal paths to the demodulator which detects the alternating-phase portion of the chrominance signal. One of these paths includes a summing device which additively combines a delayed and an undelayed signal to produce a chroma signal at the desired phase angle for alternate horizontal scansions. It is understood that the period of delay is equal to one horizontal scansion so that oppositely phased chroma information can be combined for proper demodulation. The other path includes a summing device which subtracts a delayed from an undelayed signal to produce a chroma signal at the desired phase angle despite the reversal of phase of the transmitted signal for the succeeding horizontal scansion. Switching means operated in synchronism with the horizontal scansion process alternately connects the summing devices to the demodulator so that the proper phase of the chroma signal is applied to the demodulator for each line of horizontal scansion.

In order to operate the switching means a device referred to as an identifier is used. The identifier, which may comprise a phase detector, is operative to compare an incoming burst signal with a "reference" subcarrier signal to identify which phase of the alternating phased chroma information is present for demodulation. The identifier produces a signal to control a switch such that the demodulator is always connected to the proper phase of the chroma information.

In the past, opposed-phased burst signals have commonly been provided to the identifier by means of a separate transformer in the burst keying stage of the receiver. The "reference" signal was derived from the subcarrier regeneration system used for driving the demodulators. Thus the burst keying system, besides supplying a burst signal to a subcarrier regeneration system, was further required to drive an additional transformer for providing oppositely-phased signals to the identifier. This arrangement places an undesirably heavy load upon the burst keying stage. The resulting loading of the burst keyer detrimentally affects the integrity of the burst signal produces thereby, lessening the overall effectiveness of the demodulation system. Moreover, the transformer commonly utilized to couple the burst signal to the identifier substantially affected the impedance presented to the burst keying stage.

It will therefore be seen that it would be advantageous to provide a system for commutating alternating-phase chroma information which does not require a detrimental loading of the burst keying stage.

It is therefore an object of the present invention to provide means for commutating phase-alternating chroma signals which places a substantially lessened load upon regeneration circuitry than those used in the prior art.

It is another object of the invention to provide an identifier system in a color phase-alternating color television receiver which does not require a separate burst-coupling transformer.

SUMMARY OF THE INVENTION

Briefly stated, in accordance with one aspect of the invention the foregoing objects are achieved by providing a pair of demodulators, one for detecting each of the chroma signals which are combined in quadrature with a common subcarrier. One of the chroma signals is applied directly to one demodulator, and the other chroma signal is applied to the other demodulator by means of a commutating switch. The switch alternately couples one of two chroma channels to a demodulator so that a constant-phase signal appears at the demodulator. An identifier is provided and produces alternating-polarity pulses at the proper rate for operating the switch in synchronism with the phase reversal of the chroma signal. A pair of oppositely-phased subcarrier signals are coupled from the input of one demodulator to the identifier. The remaining identifier input terminal is connected directly to the burst gating circuitry for coupling quadrature-phased burst signals to the identifier.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
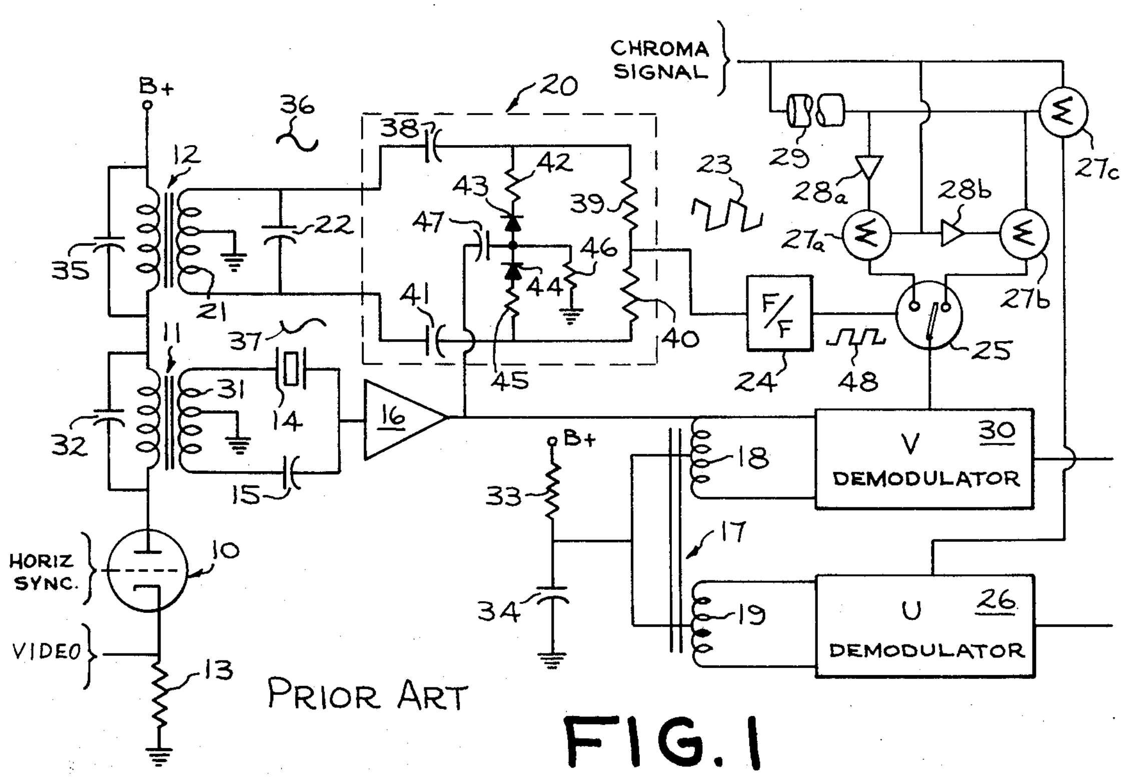
FIG. 1 is a schematic diagram of selected portions of a color phase alternation television receiver, as constructed in the prior art.

FIG. 1 shows, in simplified form, certain portions of the chroma demodulating system of a color television receiver. The Figure is intended to represent portions of a receiver constructed to operate in conformity with the so-called PAL system used in a number of countries, in which the phase of one component of a chroma signal reverses for alternate horizontal traces or scansions, i.e., for horizontal traces 1 and 3 of the same field, the chroma signals may be identified by the expression U+jV and by U−jV for horizontal traces 2 and 4, where U is one chroma signal and V is the second chroma signal which reverses phase at each horizontal scansion. A burst gate, here shown as triode 10, has its plate coupled to a source of $B^+$ or biasing potential through the series-connected primary windings of a pair of transformers 11 and 12. The grid of the triode is connected to a means for generating pulses at the horizontal line frequency (not shown), while the cathode is coupled to ground by means of resistor 13. A video signal including a burst component is impressed across resistor 13. Burst signals appearing at the plate of the gate triode 10 during gating pulse periods are transmitted through the transformer 11 to a subcarrier regeneration stage comprising a crystal 14 and a neutralizing capacitor 15. Crystal 14 is tuned to resonate at the frequency of the received burst signal, producing a continuous-wave sinusoidal signal or subcarrier of constant phase over one vertical field which corresponds to the receiver chroma signal subcarrier. The subcarrier is amplified by means of a subcarrier amplifier 16 and passed to a transformer 17 comprising first and second center-tapped windings 18 and 19, respectively.

The signal at the plate of burst gate 10 is also transmitted by means of transformer 12 to an identifier generally indicated at 20. The center-tapped secondary winding 21 of transformer 12 is shunted by tuning capacitor 22 and the opposite ends of the secondary windings are connected to two of the three input terminals of identifier 20 to provide oppositely-phased "burst" signals thereto. A subcarrier taken from one input of a first or "V" demodulator 30 is applied to the remaining input terminal of the identifier to provide a "reference" signal. The identifier operates in a manner familiar to those skilled in the art to produce a train of pulses illustrated at 23 in response to changes in the relative phase of the burst and reference signals applied to identifier 20. The pulse train is utilized to key flip-flop 24, which in turn actuates a switch means 25. In particular, when a burst signal that is positive relative to the reference subcarrier is present, the identifier will generate a positive pulse to move the switch to the first summing device at the time when a positive V chroma signal appears, and likewise a burst signal that is negative relative to the reference subcarrier will produce a negative pulse to move the switch to the second summing device at the time when a positive V chroma signal is present.

The chroma portion of the video signal derived from a bandpass amplifier (not shown) includes two chroma signals designated U and V lying in quadrature with respect to one another, is applied to summing means 27c both directly and by any of delaying means such as delay line 29. The period of delay line 29 is one horizontal scansion. This permits reconciliation of the opposite phased V chroma signal between consecutive horizontal scansions in the same field. Thus, as regards the summing device 27c, the chroma signal for two consecutive scansions, namely, U+jV and U−jV pass to the device 29 where the negative sum is obtained to provide 2U information. The output of summing means 27c is applied to a first or "U" demodulator 26.

The chroma portion of the video signal is also applied to summing means 27a and, through inverter 28b, to another summing means 27b. The output of delay line 29 is transmitted directly to summing means 27b and through inverter 28a to summing means 27a.

In operation, synchronizing pulses occurring at the horizontal line or scansion rate are abstracted from a received composite video signal by means of a sync separator (not shown), delayed slightly, and applied to the grid of burst gate 10 so that the gate is rendered conductive coincident with the occurrance of the burst pulses. A portion of the video signal, including a periodic burst signal, is continuously applied to the cathode of gate triode 10. As is familiar to those skilled in the art, the burst signal arises during the terminal portion of "back porch" of each horizontal sync interval. Therefore, since burst gate 10 is enabled only in the presence of delayed horizontal sync pulses, only the burst portion of the signal applied across resistor 13 will appear at the plate of the gate triode 10.

The burst signal comprises a sine wave of a predetermined frequency. The frequency corresponds to that of the subcarrier which is modulated by color information to comprise the transmitted chroma signal. By combining the regenerated subcarrier and the received chroma signal in a demodulator, the original color information can be retrieved. Since the synchronizing or burst information is discontinuous, it is necessary to provide a circuit which continues to oscillate afer termination of the burst signal, regenerating a continuous-wave subcarrier. In addition, the regeneration circuit serves to integrate the alternately-phase burst signals to produce a subcarrier whose phase angle is the average of the burst signal phase angles over one vertical field.

Regeneration of the chroma subcarrier is accomplished through the use of a transformer 11. The transformer comprises a tapped winding 31 which is proportioned in a manner suitable to neutralize the subsequent oscillatory circuit. A tuning capacitor 32 is connected across the primary winding of transformer 11 to tune the transformer to the subcarrier frequency. A crystal 15 is coupled in series with capacitor 15 across the ends of secondary winding 31. Crystal 14 is constructed to resonate at the subcarrier frequency in response to repeated applications of the burst gate signal, the crystal continuing to oscillate or "ring" after cessation of the burst signal. The subcarrier-frequency oscillation derived by crystal 14 is amplified by means of subcarrier amplifier 16, which may comprise one or more suitably biased vacuum tubes or transistors connected in a manner familiar to those skilled in the art. The regenerated, amplified subcarrier is then applied to a transformer 17 for application to demodulator stages 26 and 30.

The demodulators shown are advantageously of the synchronous type, each requiring the application of opposed-phase subcarriers in addition to the signal to be demodulated. To accomplish this, transformer 17 is provided with a pair of center-tapped windings 18 and 19. In addition to having the center taps thereof coupled together, windings 18 and 19 are magnetically coupled so that signals appearing across winding 18 induce similar subcarrier-frequency oscillations in winding 19. Since the upper end of winding 18 is coupled directly to subcarrier amplifier 16, the subcarrier transmitted from the upper end of the winding to V demodulator 30 is in phase with the regenerated subcarrier. Conversely, the subcarrier signal appearing at the opposite end of the winding is opposed in phase, or at 180° to, the regenerated subcarrier. The center of windings 18 and 19 are coupled by means of a resistor 33 to a source of reference potential, designated B+. A bypass capacitor 34 shunts AC signals to ground. The amplifier 16 may include phase shift means to assure the re-generated subcarrier is in quadrature with the average phase of the burst signals, i.e. the output of the crystal filter circuit 14, 15. Phase shift means may alternately be separately provided in circuit with the amplifier 16.

Since in the PAL system the V portion of the encoded chroma signal alternates between +90° and 90° with respect to the average burst phase for successive horizontal scansion periods, it will be seen that the subcarrier signals appearing across winding 18 are suitable for operating demodulator 30. It has been discovered, and will be described more fully with reference to FIG. 2 below, that since the average phase of the burst is the same as the phase of the subcarrier, the same relationship to the V chroma signal is obtained whether opposite phased burst signals and a reference subcarrier signal are applied to the identifier or opposite phased subcarrier signals and a reference burst signal is applied.

The U portion of the PAL system chroma signal, however, lies in quadrature to the V portion thereof so that opposed-phase subcarriers which are oriented at 90° with respect to those provided by winding 18 are applied to the U demodulator 26 by winding 19. Due to the magnetic coupling of windings 18 and 19, a subcarrier signal disposed at 90° with relation to regenerated subcarrier appearing at the output of amplifier 16 is produced at the upper end of winding 19, and a second subcarrier produced at the lower end thereof which lies at 270° with respect to the output of amplifier 16.

Although the V chroma signal always lies in quadrature to the U signal, in color phase alternation systems the V signal periodically alternates in phase by 180°. In the illustrated PAL receiver system, this alternation occurs at horizontal or line frequency. In order to facilitate the operation of the U demodulator, pairs of consecutive chrominance signals are combined in summing means 27*c*. Since one of the signals is delayed by a full horizontal scansion period, the oppositely-phased V signals cancel, leaving the U component to be demodulated. This is readily seen by observing that the chroma signal is of the form U+*j*V for one horizontal scansion and U−*j*V for the next horizontal scansion in the same field. If the U+*j*V signal is applied both through the delay line and directly to summing device 27*c*, the delayed signal becomes −(U+*j*V) one horizontal scansion later so that U−*j*V is combined with −(U+*j*V) (the latter being subtracted from the former) in summing means 27*c* to produce 2U, the V terms cancelling. For the subsequent horizontal scansion U−*j*V is applied to the delay line, appears as −(U−*j*V) one horizontal scansion later to be combined, as described above, with U+*j*V to produce 2U. It is also noted that since the V signal reverses phase for each horizontal scansion, the delay line is required to eliminate this discrepancy and in order to separate the U and V components of the chroma signal.

A somewhat different technique is used to provide constant-phase "V" signals to the demodulator 30. The delayed signals for each horizontal scansion are applied to an inverter 28*a* which may for example be an amplifier with a gain of −1. The inverted signal derived therefrom, and an undelayed chroma signal, are applied to a summing means 27*a*. The summing means, represented schematically by a circle, may take any one of several forms such as a resistor matrix. Further, juxtaposed inverter means may be combined in the summing means to produce a negative summing means. Thus, for the first horizontal scansion U+*j*V is applied to the delay line, appears as −(V+*j*V) at the inverter and is applied to summing device 27*a* as U+*j*V. The delay of one horizontal scansion will bring this signal to the summing device at the same time as U−*j*V will appear there by the direct path. If a negative sum is obtained, again the delayed signal is subtracted from the non-delayed signal, −2*j*V will be realized at the output. During the next scansion period U−*j*V is applied to the delay line, is inverted and becomes U−*j*V at the summing device, which when subtracted from the next scansion of U+*j*V produces 2 *j*V.

The output of the summing means 27*a* will be seen to be of the form +2V for alternate horizontal scansion periods and of the form −2V for the remaining periods. Since demodulator 30 can operate with only a single phase information signal it is necessary to provide other means for producing V information having a phase opposite to that produced by summing means 27*a*. To this end, delayed chroma signals are applied to one input terminal of summing means 27*b*, and undelayed signals to the other input terminal by way of inverter 28*b*. *Accordingly, for one scansion U+j*V chroma information is applied to the inverter to appear as −(U+*j*V) at summing device 27*b*. This signal arrives at the summing device during the scansion of the opposite phase of the chroma signal U−*j*V, which signal when applied to the inverter 28*b* apppears as −(U−*j*V). when the delayed signal is subtracted from the non-delayed signal, an output of 2*j*V is realized. It is noted that this positive signal is obtained at the time the −2*j*V signal appears at output of summing device 27*a*. During the next scansion the signal −2*j*V will appear at the output of summing device 27*b*. Thus, if means are provided to connect the demodulator 30 to the 27*a* output when +2V is realized there and then to 27*b* when +2V appears, a con-stant phase signal necessary for de-modulation can be obtained.

As shown in FIG. 1, switch 25 serves to connect demodulator 30 alternately to summing means 27*a* and 27*b* so that the resulting, commutated signal is always +2V. In order to operate switching means 25 it is necessary to generate a signal which occurs at one-half the line rate, i.e., one-half the horizontal scansion rate since the +2V output appears at each summing device at every horizontal scansion, and varies in synchronism therewith. Moreover, the generated signal should reflect the relationship between the phase of the burst and the chroma signals so that each horizontal scansion can be identified insofar as chroma signal phase is concerned. To this end, the burst signal appearing at the plate of triode 10 is applied to the primary winding of transformer 12. A tuning capacitor 35 is connected in shunt about the primary winding and another tuning capacitor 22 coupled across center-tapped secondary winding 21. Due to the center-tapped connection of the secondary winding, the periodic burst signals 36 and 37 appear in phase opposition at the distal ends of the winding. The burst signals are applied to the two oppositely-located input terminals of identifier 20. The third input necessary for the operation of identifier 20 comprises a reference or subcarrier signal taken from subcarrier amplifier 16. Thus identifier 20 receives both opposed-phase burst information, which reflects the phase and timing of each received burst signal, and a subcarrier which lies at a predetermined phase angle to a given burst signal.

Identifier 20 operates in the manner of a phase detector, a device familiar to those skilled in the art. Oppositely-phased burst signals 36 and 37 are impressed across opposite ends of a circuit comprising the series combination of a capacitor 38, resistors 39 and 40, and capacitor 41. The series combination of resistor 42, diodes 43 and 44 and resistor 45 are coupled in shunt about series-connected resistors 39 and 40. The junction between diodes 43 and 44 is connected to ground by means of a resistor 46, and to the regenerated subcarrier signal by a capacitor 47. In the absence of the subcarrier signal, the oppositely-phased burst signals 36, 37 produce a voltage at the midpoint of resistors 39 and 40 which is the difference of the signal voltages, or zero. Equal and opposite charges are always present upon capacitors 38 and 41, and the voltage drop occasioned thereby is evenly divided across resistors 39 and 40 to produce a voltage at the juncture therebetween which is equivalent to ground potential, or zero. When the regenerated subcarrier signal is impressed upon the junction of diodes 43 and 44 by way of capacitor 47, the voltage at the intersection of resistors 39 and 40 will deviate from zero as a function of the phase relationship existing between the subcarrier signal and the burst signals 36, 37. For example, if a subcarrier signal is applied which has a leading phase relationship with respect to burst signal 36, diode 43 will be forward-biased for those portions of time when the subcarrier signal is more positive than the burst signal. Capacitor 38 accumulates extra charge by way of resistor 42 and a charge imbalance arises between capacitors 38 and 41. The asymmetrical charge upon the otherwise-symmetrical identifier circuit produces a positive-going voltage at the intersection of resistors 39 and 40.

Similarly, for a lagging subcarrier signal, diode 44 will be biased into conduction, discharging capcitor 41 to a greater or lesser degree depending on the relative phase angle of the burst and the subcarrier signals. The lowered voltage across capacitor 41 is reflected by a negative-going voltage arising at the junction of resistors 39, 40. Therefore, the polarity of the voltage by identifier 20 reflects the nature of the phase differential between the subcarrier and the burst signals, In PAL system signal transmission, the relative phase angle of the burst signal alternates for alternate horizontal lines. The phase difference between consecutive burst signals is ordinarily 90°, the bursts occurring at angles +45° and −45° with respect to the continuous-wave regenerated subcarrier. Since the V portion of the chroma signal also alternates phase for consecutive horizontal lines, the relative phase of the burst signal relative to the continuous-wave subcarrier may be used to identify the nature of the V chroma signal any given horizontal line. By using identifier 20, this alternation in phase may be translated into an alternation in the polarity of a signal which occurs at line frequency, so that the identifier outputs pulses which occur in synchronism with V signal alternations and which have a polarity which corresponds to the phase of the signals.

Since the burst signals arising across secondary winding 21 occurs for only a small portion of each horizontal line period, the signal produced by identifier 20 in response to the presence of the burst is relatively short. However, due to the R-C time constant of the identifier circuitry, the pulses thus produced decay relatively slowly, as depicted by waveform 23. Nonetheless, the waveform produced may be inadequate to properly drive switching means 25. To this end, a flip-flop 24 is provided. The flip-flop may advantageously be an astable multivibrator such that positive-going signals received from identifier 20 triggers the flip-flop into a first state, so that a train of regular, rectangular pulses 48 are produced for energizing switching means 25 in synchronism with the V signal to be commutated.

Figure 2:
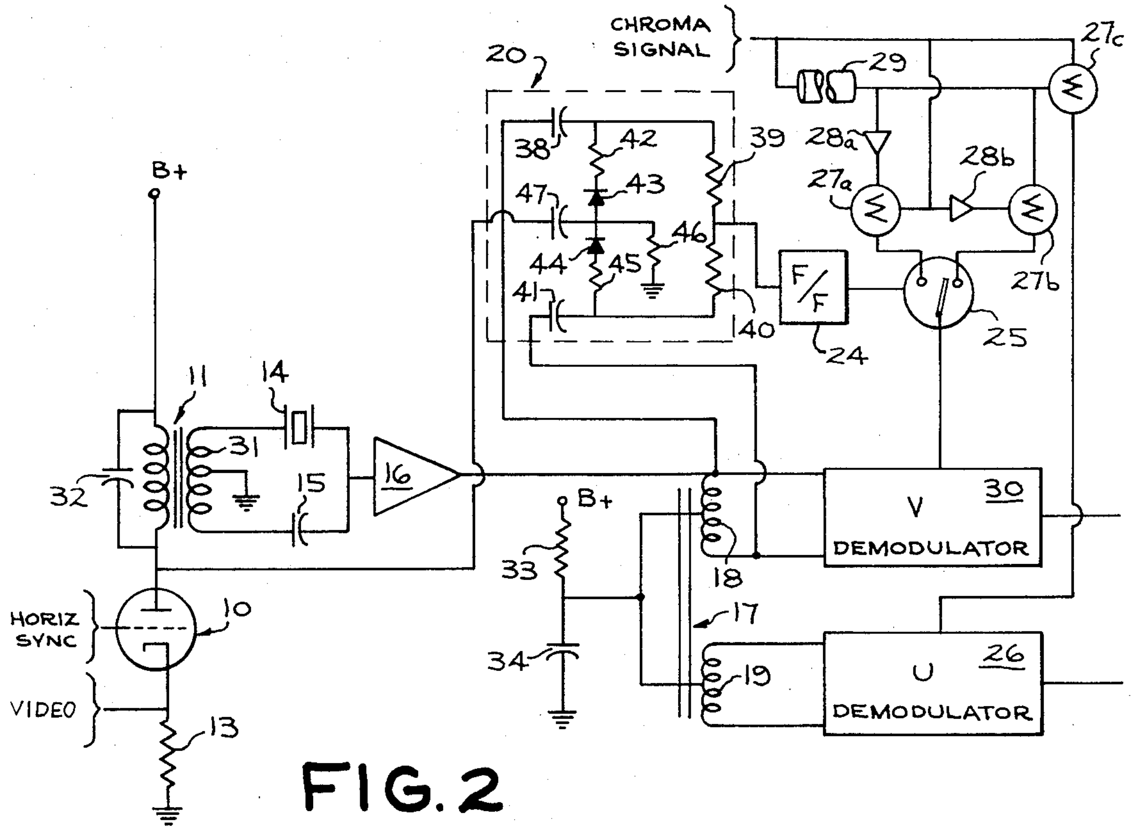
FIG. 2 is a schematic diagram of portions of a color television receiver similar to those represented in FIG. 1, constructed in accordance with the teachings of the present invention.

Referring now to FIG. 2, there is shown an improved system for producing subcarrier signals at the requisite phase angles, and for operating an identifier system to allow the commutation of summed chroma signals for application to a V demodulator. As in the prior art circuitry of FIG. 1, a burst gate 10 is provided and adapted to receive horizontal synchronizing pulses by a sync separator stage, and a video signal including a burst portion. The video signal is applied across resistor 13, but since the tube is rendered conductive only in the presence of horizontal sync pulses, only the burst portion of the composite signal appears at the plate of the tube. A transformer 11 is coupled to the plate terminal of the burst gate tube 10, and the primary winding thereof shunted by tuning capacitor 32. The secondary winding 31 is tapped intermediate the ends thereof for purposes of neutralization, and the series combination of a crystal 14 and capacitor 15 coupled across the ends of the secondary winding to derive a continuous-wave subcarrier from the applied burst signal. The oscillations arising across crystal 14 are applied to a suitable subcarrier amplifier 16 and resulting subcarrier signal applied to a transformer 17. Secondary windings 18 and 19 of transformer 17 serve to produce subcarriers at 90° phase intervals for application to a V signal demodulator 30 and a U signal demodulator 26, respectively. It will be seen that the ends of center-tapped secondary winding 18 are also coupled to an identifier 20 which is of a design similar to the identifier represented in FIG. 1. The remaining input necessary to the operation of identifier 20 comprises a burst signal which is derived directly from the plate of burst gate 10.

It will now be appreciated that the three inputs to identifier 20, while effecting in nature from those applied to corresponding input terminals in the system of FIG. 1, together embody the same information as that applied to the identifier in the prior art system illustrated. More specifically, the two opposed-phase signals applied to the identifier now comprise continuous-wave subcarriers or reference signals which in the illustrated embodiment arise at +90° and −90° with respect to the average phase angle of any two consecutive burst signals. Further, the remaining input to the identifier, rather than being a continuous-wave subcarrier, comprises an intermittant burst signal which occurs periodically for only a few cycles. Despite the transposition of the information inputs the identifier acts in precisely the same manner as was described above to produce a train of horizontal-rate pulses 23 for energizing the flip-flop 24. The identifier output is thus the same for both FIGS. 1 and 2, since it is the relationship among the applied signals which determines the output of the identifier rather than the character of any one of the signals.

While identifier 20 continues to effect commutation of incoming V chroma signals through the use of switching means 25, a decided improvement in system operation is achieved. More specifically, loading upon burst gate 10 is significantly lessened due to the presence of only a single subcarrier transformer. While a slight degree of loading results from the coupling burst signals directly from the burst gate 10 to identifier 20, the current flow involved is substantially less than was the case when a separate transformer 12 and associated tuning capacitors were utilized. Further, the series-connected primary winding of transformer 12 is eliminated from the burst plate circuit. The identifier portion of the circuit thus effectively presents a substantial impedance to the burst gate so that a substantial decrease in loading is achieved. The lessened loading of the burst gating system allows better reproduction of the burst signal in transformer 11, enhancing the regeneration of the continuous-wave subcarrier needed for chroma demodulation.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. In a color television receiver adapted to receive a composite video signal including a color information signal and a synchronizing signal both of which are characterized by predetermined, periodic changes in phase, means for demodulating the color information signal comprising:

first and second demodulator means;

gating means for abstracting the synchronizing signal from the composite signal;

means for receiving the abstracted synchronizing signal and for deriving a continuous, constant-phase subcarrier therefrom;

means for simultaneously applying said subcarrier to said first and said second demodulator means at different phase angles;

means for receiving said color information signal and for imparting a delay thereto substantially equal to the period of said changes in phase;

first summing means for receiving the delayed and undelayed color information signals and outputting a color information signal having a predetermined phase relationship to said subcarrier during first, alternate time periods;

second summing means for receiving the delayed and undelayed color information signals and outputting a color information signal having said predetermined phase relationship to said subcarrier during second time periods occurring between said first, alternate time periods;

third summing means for receiving the delayed and undelayed color information signals and outputting to said second demodulator means a color information signal characterized by an absence of the predetermined, periodic changes in phase;

switch means operable to alternately couple said first demodulator means to said first and said second summing means;

identifier means for operating said switch means in synchronism with changes in the phase relationship of signals suppled thereto;

means for applying two of the differently-phased subcarriers to said identifier means; and means for coupling said synchronizing signal from said gating means to said identifier means.

2. The invention defined in claim 1, wherein said identifier means is responsive to said synchronizing signal and said two differently phased subcarriers to develop a control signal to control said switch means in synchronization with the relative phase changes between said synchronizing signal and two differently phased subcarriers.

3. The invention defined in claim 2, wherein said means for applying said subcarrier to said first and said second demodulator means includes coupling means to apply said subcarrier at a first phase angle and at a second phase angle to said first demodulator means and to apply said subcarrier at a third phase angle and at a fourth phase angle to said second demodulator means, wherein said third and fourth phase angles are in quadrature with respect to said first and second phase angles respectively, and said second phase angle is 180° displaced from said first phase angle, and wherein said subcarrier at said first and second phase angles is applied to said identifier means.

4. In a color television receiver adapted to receive a composite video signal including first and second chroma signals and burst signals, said first chroma signal and said burst signal alternating in phase for consecutive horizontal scansion periods, means for demodulating said chroma signals comprising:

identifier means having first, second and third input terminals and an output terminal and operable to produce a voltage at said output terminal representative of the phase relationship of signals applied to said first, second and third input terminals;

regenerator means response to said burst signals for producing a continuous, constant-phase subcarrier;

means for applying said burst signal to said regenerator means and to said first input terminal of said identifier means;

first and second demodulators;

transformer means for receiving the constant-phase subcarrier from said regenerator means and for applying a first pair of signals displaced in phase by 180° and occurring at the subcarrier frequency to said first demodulator and to the second and third input terminals of said identifier, and for applying two other signals displaced in phase by 180° and occurring at the subcarrier frequency to said second demodulator, said two other signals being displaced in phase by 90° relative to corresponding ones of said first pair of signals;

first means for outputting said first chroma signal at a given phase angle relative to said subcarrier during alternate horizontal scansion periods;

second means for outputting said first chroma signal at said given phase angle during the other horizontal scansion periods;

third means for outputting said second chroma signal at a relatively constant phase angle during consecutive horizontal scansion periods;

switch means responsive to said voltage for alternately coupling said first demodulator to said first means or said second means;

means coupling said output terminal of said identifier to said switch means; and means coupling said second demodulator to said third means.

5. The invention defined in claim 4, wherein said means coupling said output terminal of said identifier means to said switch means comprises bistable circuit means for attaining a first state upon application of a voltage of a first polarity, and a second state upon application of a voltage of a second polarity.

6. The invention defined in claim 5, further including delay line means coupling said first chroma signal to said first and said second means and operative to impart a delay of substantially one horizontal scansion period to said first chroma signal; and means coupling said first chroma signal directly to said first and second means.

* * * * *